United States Patent [19]

Thomas et al.

[11] 4,333,302
[45] Jun. 8, 1982

[54] COMBINED A.C./D.C. ELECTRIC LAWN MOWER

[75] Inventors: Ronald Thomas, 9350 S. Parnell Ave., Chicago, Ill. 60620; Donald H. Smith, Crystal Lake, Ill.

[73] Assignee: Ronald Thomas, Chicago, Ill.

[21] Appl. No.: 243,551

[22] Filed: Mar. 13, 1981

[51] Int. Cl.³ ............... A01D 35/262; A01D 69/04; A01D 69/08; A01D 69/10
[52] U.S. Cl. .................................. 56/10.5; 56/10.6; 56/11.3; 56/11.9
[58] Field of Search ............... 56/11.9, 10.6, 10.5, 56/10.2, 11.3

[56] References Cited

U.S. PATENT DOCUMENTS

| | | | |
|---|---|---|---|
| 969,797 | 9/1910 | Mustin | 56/10.5 |
| 2,298,135 | 10/1942 | Klein | 56/10.5 |
| 2,417,613 | 3/1947 | Radabaugh | 56/11.9 |
| 2,906,081 | 9/1959 | Flanigan | 56/10.6 |
| 3,142,950 | 8/1964 | Wiest | 56/10.5 |
| 3,212,244 | 10/1965 | Wilgus | 56/11.9 |
| 3,230,695 | 1/1966 | Wiest | 56/10.5 |
| 3,500,085 | 3/1970 | Smith | 56/10.6 |
| 3,570,227 | 3/1971 | Bellinger | 56/11.9 |
| 3,841,069 | 10/1974 | Weck | 56/11.9 |
| 4,064,680 | 12/1977 | Fleigle | 56/11.9 |
| 4,195,466 | 4/1980 | Heismann | 56/10.5 |

FOREIGN PATENT DOCUMENTS

| | | | |
|---|---|---|---|
| 2032695 | 1/1972 | Fed. Rep. of Germany | 56/11.9 |
| 2049609 | 4/1972 | Fed. Rep. of Germany | 56/11.9 |

*Primary Examiner*—Paul J. Hirsch
*Attorney, Agent, or Firm*—Silverman, Cass & Singer, Ltd.

[57] ABSTRACT

An electric lawn mower including an A.C. motor and a D.C. motor connected through a gearing and clutch arrangement for operation of either motor separately or concurrently. The gearing arrangement includes a mower blade drive gear acted upon by either of the respective driven gears associated with the A.C. and D.C. motors. The mower may be operated by either the A.C. motor or the D.C. motor separately, or by both motors combined to provide increased power to the cutting blade for mowing of dense areas of vegetation.

6 Claims, 8 Drawing Figures

COMBINED A.C./D.C. ELECTRIC LAWN MOWER

BACKGROUND OF THE INVENTION

1. Field of the Invention

This invention relates generally to electric lawn mowers, and more particularly, to an electric lawn mower selectively operable by a D.C. motor, or an A.C. motor, or both motors simultaneously.

2. Description of the Prior Art

It is known in the art to provide electric lawn mowers for operation by a A.C. motor. Such mowers derive their current source for operation through an electric cord which generally is connected to a conventional electric outlet such as a 110 or 220 volt outlet located adjacent the area intended to be mowed. Such A.C. motor operated mowers have the disadvantage in that the distance they may travel from the current source is limited by the length of the cord through which the current source is supplied.

It also is known in the art to provide for operation of electric lawn mowers by a D.C., or battery source. Battery or cordless electric lawn mowers obviate the aforementioned disadvantage of A.C. operated mowers; however, battery operated lawn mowers are limited in the length of time they may continuously be operated because of the amount of energy a battery can retain without having to be recharged. In order to afford battery operated mowers extended length of operation time needed to mow a relatively large size area, an oversize battery which is capable of holding a large charge is required. Such large batteries are impractical for use in mowers because of the weight and increased size which are their characteristics.

The present invention overcomes the disadvantages of separately operated A.C. motor and D.C. motor lawn mowers by combining such motors together in one mower to obtain the benefits of both types in a construction providing for separate or concurrent operation of the motors.

SUMMARY OF THE INVENTION

An electric lawn mower including both A.C. and D.C. motors connected to a gearing and clutch arrangement whereby either motor may be operated separately or concurrently, as desired. In one mode of operation, the A.C. motor drives an associated gear and powers a centrally operating cutting blade. During this mode, a gear associated with the D.C. motor is permitted to free-wheel by its associated clutch assembly. When desired, the operator can switch to operation by the D.C. motor only, during which mode the gear associated with the A.C. motor is permitted to free-wheel by its associated clutch assembly. In a third mode, both motors can be energized by operation of both clutch assemblies to provide increased power to the cutting blade by supplying simultaneous driving power to the cutting blade for mowing dense areas of vegitation growth.

Other objects and advantages of the invention will become evident from the following description when read in conjunction with the accompanying drawings which illustrate the invention in its preferred embodiment.

DESCRIPTION OF THE PREFERRED EMBODIMENT

Figure 1:
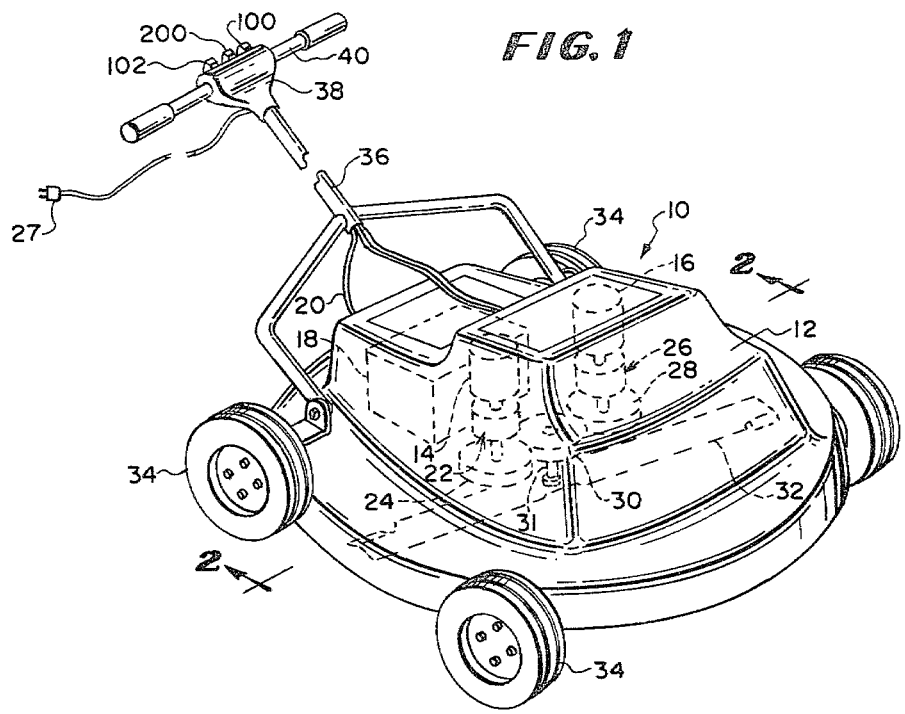
FIG. 1 is a perspective view of the electric lawn mower of the present invention, portions of which are shown in phantom outline.
Figure 2:
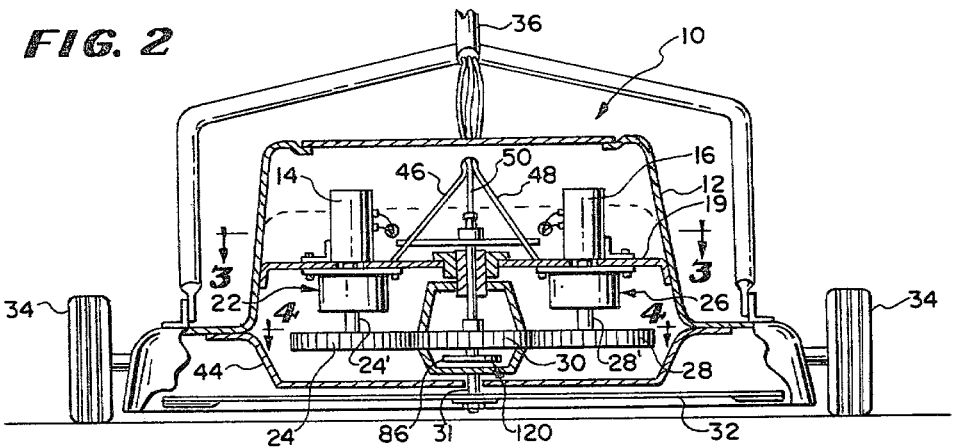
FIG. 2 is a sectional view taken along the line 2—2 of FIG. 1, in the direction indicated generally.
Figure 3:
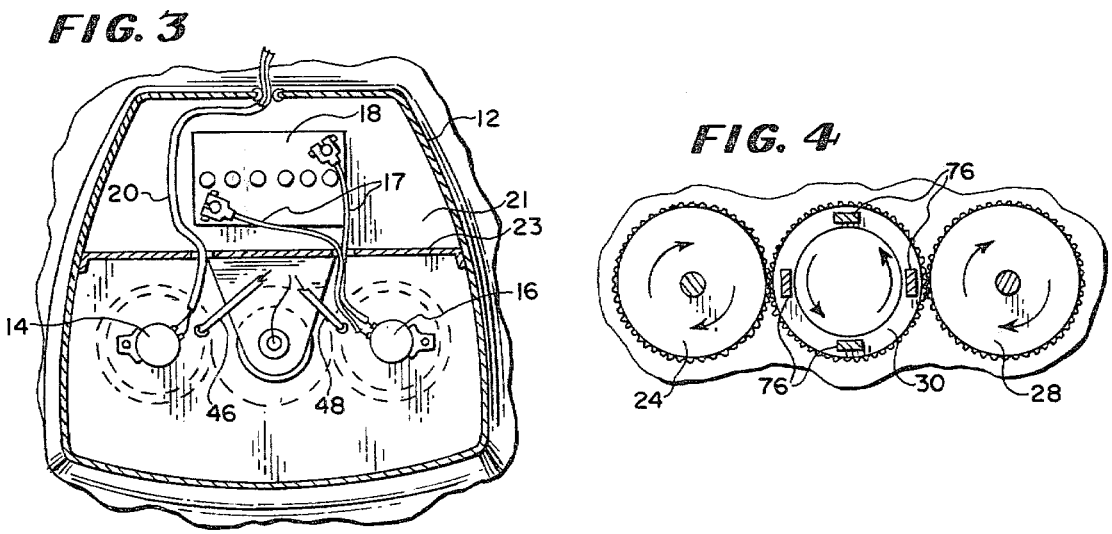
FIG. 3 is a sectional view taken along the line 3—3 of FIG. 2, in the direction indicated generally.

Referring to the figures, there is illustrated a lawn mower 10 comprising a conventional stamped housing 12 within which is enclosed an A.C. electric motor 14, a D.C. electric motor 16, and a battery 18. The motors 14, 16 are secured to a horizontally disposed support plate 19 and are separated from the compartment 21 for retaining battery 18 by bulkhead 23. An electric cord 20 is provided for supplying power to A.C. motor 14 through plug 27 which is connected to cord 20 beyond its connection to control panel 38 as described hereafter.

Figure 4:
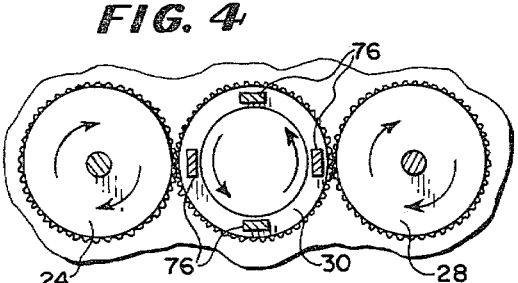
FIG. 4 is a sectional view taken along the line 4—4 of FIG. 2, in the direction indicated generally.

A.C. motor 14 drives gear 24 connected thereto through its associated clutch assembly 22. Similarly, a D.C. motor 16 drives gear 28 through an associated clutch assembly 26. Each of the driven gears 24, 28 is mounted and arranged with a drive gear 30 disposed therebetween so that gears 24, 28 may operate separately or concurrently to rotate gear 30 as seen in FIG. 4. Drive gear 30 is connected through shaft 31 to mowing blade 32 mounted beneath a protective covering pan 44.

The mower 10 includes the usual conventional elements such as four wheel assemblies 34 and a positionable handle 36 through which electric cord 20 and the other control cables for operation of the mower are disposed and terminate at control panel 38 mounted on the mower handgrip bar 40.

Figure 5:
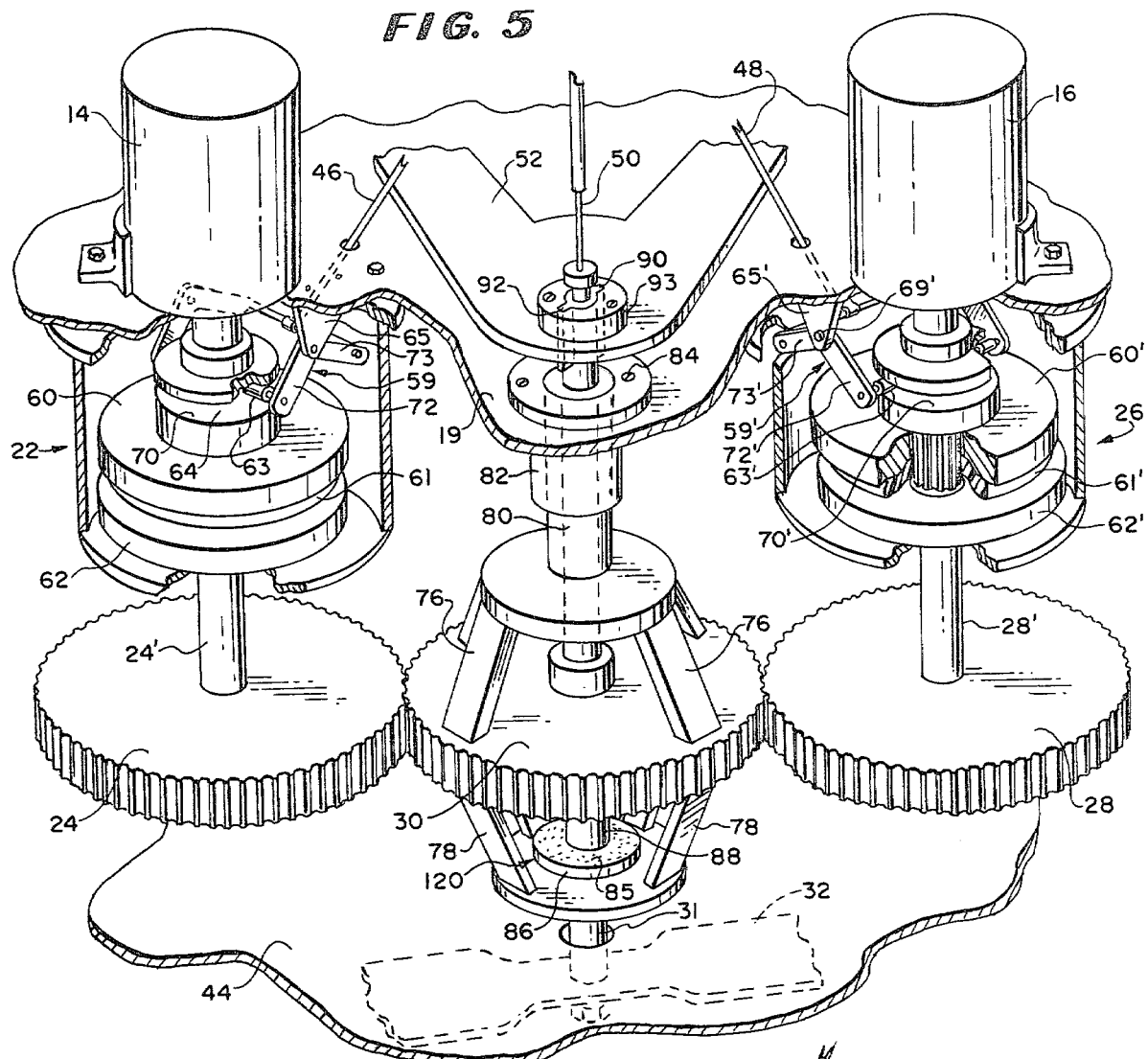
FIG. 5 is an enlarged perspective view of the motors and associated gears and clutch assemblies of the electric lawn mower.

Looking at FIG. 5, the various elements of the mower drive motors, clutch assemblies and gears are shown in detail. Each motor 14, 16 has associated therewith a respective clutch assembly 22, 26. Each clutch assembly 22, 26 is identical in construction to the other and, therefore, only assembly 22 associated with A.C. motor 14 will be described in detail. Since the clutch assembly 22 associated with A.C. motor 14 is the same as clutch assembly 26, the latter will not be separately described. However, like reference numbers are used in the figures for like elements of each assembly, but the numbers for the elements of assembly 26 have primes (') associated therewith.

Figure 6:
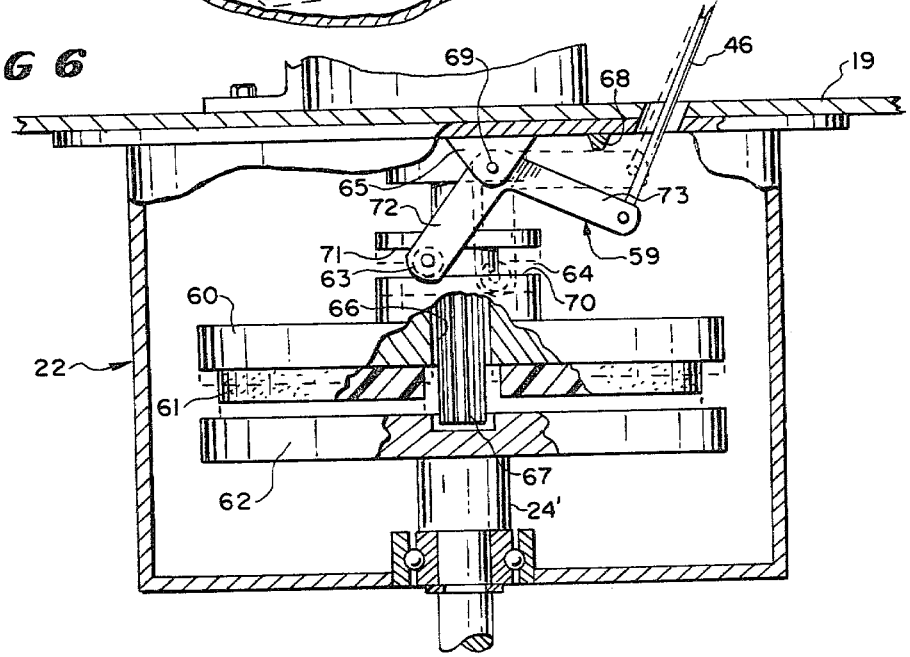
FIG. 6 is a fragmentary sectional view illustrating one of the clutch assemblies of the mower.
Figure 7:
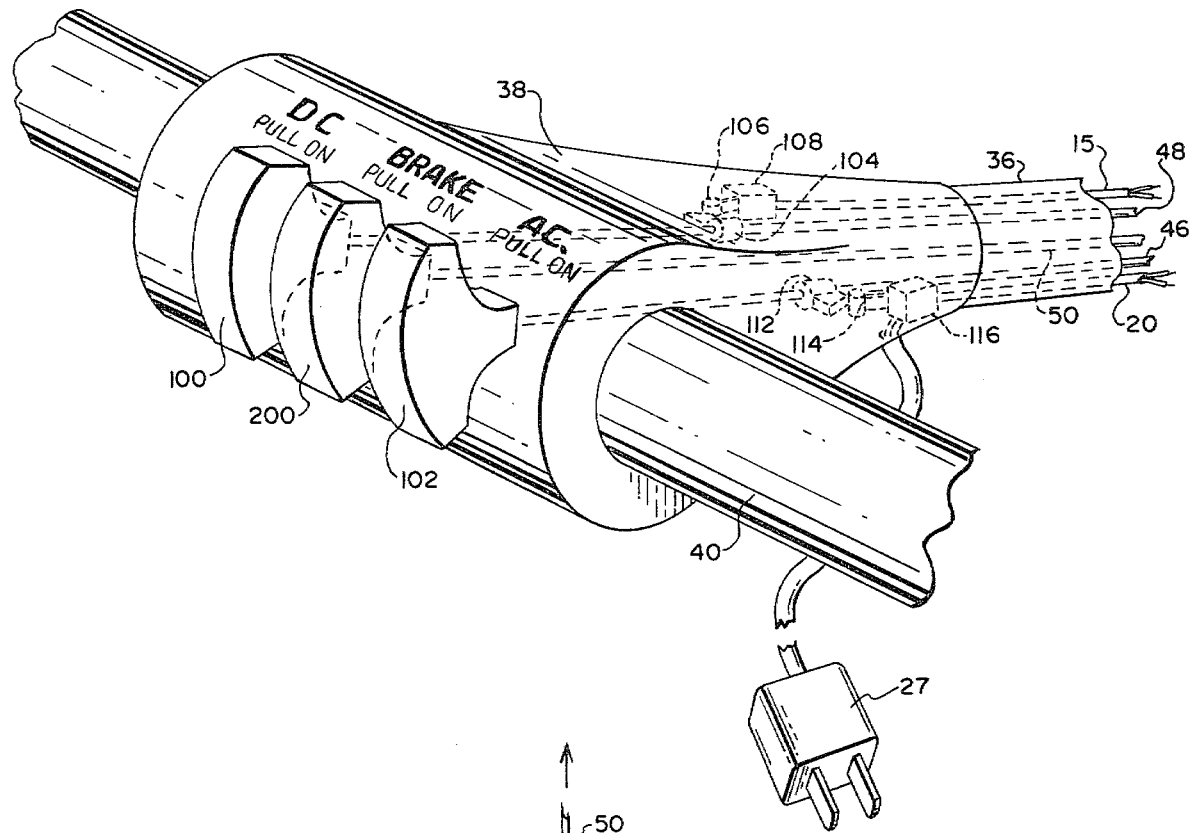
FIG. 7 is a fragmentary perspective view of the control panel for the electric lawn mower, portions of which are shown in phantom outline.

As best seen in FIG. 6, clutch assembly 22 includes respective, oppositely facing, clutch plates 60, 62. Since the three gears 24, 28 and 30 are always in contact, the driven clutch plates 62, 62' are in motion at all times. In order to effect movement of mower blade 32, the driving clutch plates 60, 60' are moved into contact either alternately or simultaneously (or singularly) with driven clutch plates 62, 62' so as to effect the combined power action which may be desired as described below.

A frictional clutch facing 61 is secured to the underside of clutch plate 60 and is brought into contact with clutch plate 62 by operation of sliding vertical motion of clutch plate 60. This latter operation is accomplished by movement of control cables 46 (for clutch assembly 22), 48 (for assembly 26), to move bell crank assembly 59 mounted for operation of the clutches. Bell crank assembly 59, 59' is provided with rollers 63 which ride in grooves 64 of the clutch assembly. Rollers 63 permit solid mounting of the bell crank to the housings of the clutch assemblies 22 and 26 by means of mounting bracket 65.

Clutch plates 60 are splined, as shown at 66, to motor shafts 67. This arrangement facilitates solid interconnection between the respective motor shaft and the driving clutch plate 60, but allows the clutch plate to be moved vertically for engagement and disengagement of the clutch facing 61 with plate 62.

Clutch assembly 22 is operable by pulling on cable 46; assembly 26 is operable by pulling on cable 48. As shown in FIG. 6, pulling on cable 46 operates bell crank assembly 59 by moving arm 73 thereof to an over-center position until it abuts stop member 68 associated therewith. This condition is shown in dotted outline. Arm 72 of the bell crank assembly thereby is moved counter-clockwise so that roller 63 engages in groove 64 against the surface 70 of the clutch plate to move plate 60 downwardly; this is accomplished as roller 63 moves in groove 64 in an arcuate plane relative to pivot point 69 where assembly 59 is mounted to bracket 65. While riding in groove 64 of the clutch plate assembly, roller 63 can spin with the rotation of the clutch plate assembly and supply downward pressure on surface 70, or upward (release) pressure on oppositely-facing surface 71. This permits vertical apply-release action of the clutch plate 60 as it travels vertically while locked into rotation with motor shaft 67 by means of splines 66. When the bell crank is moved into its "apply" action condition when cable 46 is pulled, the arm 72 of assembly 59 is moved to a position just past vertical (shown in dotted outline), controlled by the position of arm 73 which is stopped by stop member 68. The bell crank thereby is locked slightly over-center to maintain clutch pressure and rotation of the associated gear 24 or 28 which are connected by respective shafts 24', 28' to clutch plates 62, 62'.

The control cables 46, 48 are activated by operation of actuating members 100, 102 located in control panel 38 on handgrip bar 40. To commence operation of the D.C. motor 16, actuating member 100 is withdrawn from the control panel 38. Cable 48 thereupon is pulled upwardly and passes a catch member 104 mounted thereto over a switch trip lever 106 mounted on switch assembly 108 within the control panel. Closing of switch assembly 108 connects the battery source 18 through cables 17 to motor 16 through electrical leads 15 between the motor and the switch assembly. Thus, D.C. (battery) power is delivered to D.C. motor 16 to start its operation. Further, withdrawal of actuating member 100 to move cable 48 causes clutch assembly 26 for the D.C. motor to engage and thereby rotate driven gear 28 and drive gear 30 to drive the mower blade 32 connected thereto. The A.C. motor 14 and associated clutch assembly 22 and driven gear 24 similarly are operable through cable 46, actuating member 102, associated catch member 112, switch trip lever 114 and switch assembly 116.

Figure 8:
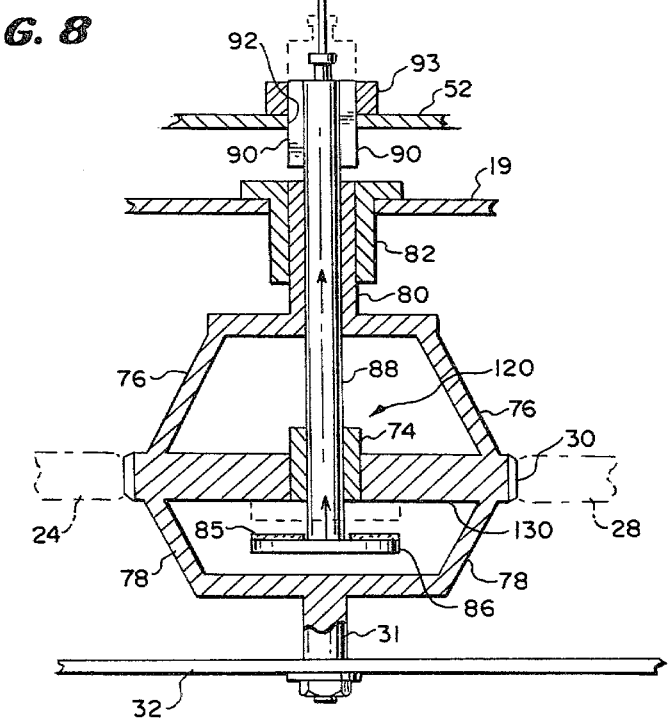
FIG. 8 is a fragmentary sectional view illustrating the braking assembly of the lawn mower.

Brake member 120 is provided for effecting braking of blade 32 when discontinued operation of the lawn mower 10 is desired. As best illustrated in FIG. 8, brake member 120 is mounted in association with drive gear 30 positioned between driven gears 24, 28. Gear 30 includes a central hub bearing 74 and upper and lower gear struts 76, 78. Gear shaft 80 extends from struts 76 upwardly and passes through bearing 82 secured within support plate 19 by screws 84. Brake disc 86 is formed on the end of brake actuator shaft 88 which passes through bearings 74 and 82 and terminates at brake support plate 52 mounted to the mower frame. A pair of ears 90 is formed on the end of brake shaft 88 for mating engagement in grooves 92 provided in bearing block 93 secured to support plate 52. The ears 90 on the shaft 88 prevent the shaft from rotating by reason of their engagement in grooves 92. An actuating cable 50 is attached to brake shaft 88 and extends to brake actuating member 200 in control panel 38.

Brake 120 is operable when both A.C. and D.C. power is shut off by operation of actuating members 100, 102. Brake actuating member 200 then may be pulled to withdraw cable 50 and move brake shaft 88 upwardly to engage a friction pad 85 on brake disc 86 against the undersurface 130 of gear 30. Since brake shaft 88 is prevented from rotating by ears 90 in slots 92, engagement of friction pad 85 against gear 30 will bring the gear, and the connected blade 32, to a stop.

It will be appreciated that either of gears 24 or 28 may be operated through their respective motors separately or simultaneously as desired. When both motors 14, 16 are in operation, both clutch assemblies 22, 26 are in action and the cable-actuated switches 108, 116 have completed the two desired circuits. If either the A.C. or D.C. motor is disengaged while the other is left engaged, the associated clutch assembly is released and power is cut off to the respective motor. The remaining power source continues to drive mower blade 32 which is connected to the energized motor through drive gear 30. When both motors are cut off, the wheeling blade 32 is stopped by pulling actuating member 200 and withdrawing brake cable 50 to engage friction brake disc 86 against drive gear 30 to stop the blade. The gears 24, 28 and 30 are arranged such that both motors can drive the blade simultaneously, but if one motor stops the driven gear 30 will continue to rotate without reducing much of the efficiency of the other motor because the driven gear will not turn the shaft of the stopped motor.

Variations may be made in the construction and arrangement of parts or elements of the embodiment disclosed herein without departing from the spirit and scope of the invention as defined in the following claims.

We claim:

1. An electric lawn mower including a housing, and a cutting blade, said mower comprising, an A.C. motor and a D.C. motor mounted adjacent each other within the housing, a driven gear and an engageable clutch assembly associated with each respective motor for selectively imparting rotative movement from each motor to its associated driven gear, a drive gear engaged between said driven gears for interaction therewith, the drive gear being connected to the blade for imparting cutting movement thereto, whereby upon energization of either motor and its associated clutch assembly separately its associated driven gear will impart motion to the drive gear and blade and upon energization of both motors concurrently the combined power of said motors is imparted through their associated driven gears to said drive gear and the blade.

2. An electric lawn mower as claimed in claim 1 in which either of said driven gears may be operated separately or concurrently to impart motion to the drive gear.

3. As electric lawn mower as claimed in claim 1 in which each clutch assembly includes a driving plate connected directly to its associated motor and a driven plate connected directly to its associated driven gear and means to cause said plates to engage one another to effect movement of said driven gears upon energization of one or both motors.

4. An electric lawn mower as claimed in claim 3 in which said means to cause said plates to engage one another include a clutch-engagement cable associated with each respective clutch assembly, said cables passing from said clutch assemblies to a handle extending from said housing, and means on said cables to actuate respective switches for each motor, whereby upon movement of said cables the associated switch will be closed to energize the associated motor and engage the plates of the associated clutch assembly.

5. An electric lawn mower as claimed in claim 3 or 4 in which said means to cause said plates to engage one another include a respective bell crank assembly having rollers adapted to move in a groove provided in one of said plates, said rollers being positioned on an arm member operable to press the rollers against the groove to move the associated plate and thereby engage the clutch.

6. An electric lawn mower as claimed in claims 1, 2 or 3 including a brake member mounted for interaction with said drive gear, the brake member including a brake disc formed on an actuation shaft passing through the drive gear, means to prevent rotation of the actuation shaft and a brake actuating cable passing from said shaft to a handle extending from said housing, whereby upon movement of said brake actuating cable the brake disc is moved into contact with the drive gear to brake the same.

* * * * *